(12) United States Patent
Hu et al.

(10) Patent No.: US 8,429,070 B2
(45) Date of Patent: Apr. 23, 2013

(54) REAL TIME ADAPTIVE CONTROL OF TRANSACTION REVIEW RATE SCORE CURVE

(76) Inventors: Hung-Tzaw Hu, Saratoga, CA (US); Jason Eaton, Capitola, CA (US); Scott Boding, Mountain View, CA (US); Jianji Ma, Cupertino, CA (US)

( * ) Notice: Subject to any disclaimer, the term of this patent is extended or adjusted under 35 U.S.C. 154(b) by 0 days.

(21) Appl. No.: 13/488,056

(22) Filed: Jun. 4, 2012

(65) Prior Publication Data

US 2013/0013488 A1 Jan. 10, 2013

Related U.S. Application Data

(63) Continuation of application No. 12/573,693, filed on Oct. 5, 2009, now Pat. No. 8,214,285.

(51) Int. Cl.
*G06Q 40/00* (2012.01)
(52) U.S. Cl.
USPC .................................. 705/38; 705/39; 705/35
(58) Field of Classification Search ............... 705/38–39, 705/35
See application file for complete search history.

(56) References Cited

U.S. PATENT DOCUMENTS

| | | | |
|---|---|---|---|
| RE33,267 E | 7/1990 | Kraus | |
| 6,029,154 A | 2/2000 | Pettitt | |
| 7,251,624 B1 | 7/2007 | Lee et al. | |
| 7,356,503 B1 | 4/2008 | Johnson et al. | |
| 7,376,618 B1 | 5/2008 | Anderson et al. | |
| 7,403,922 B1 | 7/2008 | Lewis et al. | |
| 7,418,417 B2 | 8/2008 | Chackl et al. | |
| 7,752,084 B2 | 7/2010 | Pettitt | |
| 7,865,427 B2 | 1/2011 | Wright et al. | |
| 7,970,701 B2 | 6/2011 | Lewis et al. | |
| 8,214,285 B2 | 7/2012 | Hu et al. | |
| 2002/0128960 A1 | 9/2002 | Lambiotte et al. | |
| 2002/0194119 A1 | 12/2002 | Wright et al. | |
| 2003/0014379 A1 | 1/2003 | Saias et al. | |
| 2003/0018549 A1 | 1/2003 | Fei et al. | |
| 2004/0054619 A1 | 3/2004 | Watson et al. | |
| 2004/0064401 A1 | 4/2004 | Palaghita et al. | |

FOREIGN PATENT DOCUMENTS

| EP | 0 598 469 A2 | 5/1994 |
|---|---|---|
| WO | 94/06103 A1 | 3/1994 |

OTHER PUBLICATIONS

Office Action for Canadian Application No. 2,426,168 mailed on Mar. 30, 2010, 4 pages.
Current claims for Canadian Application No. 2,426,168, 13 pages.
International Search Report and Written Opinion of the International Searching Authority mailed on Nov. 22, 2010 for PCT Patent Application No. PCT/US10/51306, 7 pages.
Current claims of PCT/US10/51306, Dec. 2010, 5 pages.
"Cybersource(R) Introduces Most Sophisticated Internet Fraud Tool for eCommerce"; PR Newswire; Oct. 26, 1999; 3 pages.

*Primary Examiner* — Elda Milef
(74) *Attorney, Agent, or Firm* — Kilpatrick Townsend & Stockton, LLP

(57) ABSTRACT

Modern technologies of signal processing and real-time feedback adaptive control are applied to a fraud screen model to enable the fraud screen model to adapt to changes in shopping behavior to effectively maintain the model's performance on a review rate score curve continuously. Multiple techniques disclosed herein integrate control technologies with modeling technology to control the review rate score curve in real time.

18 Claims, 16 Drawing Sheets

GRAPH 710

GRAPH 720

GRAPH 730

GRAPH 740

GRAPH 910

GRAPH 920

FIG. 12

GAIN MATRIX 640

| !000_Risk_Rank | Rank_Freq. | cts_raw_score lower | upper | Accum Freq. | Freq Remainder | Review Rate |
|---|---|---|---|---|---|---|
| 172 | 6,572 | 3,447 | 3,471 | 249,217 | 1,921,458 | 0.88519 |
| 581 | 182 | 14,033 | 14,038 | 2,039,398 | 131,277 | 0.060478 |
| 582 | 221 | 14,039 | 14,045 | 2,039,619 | 131,056 | 0.060379 |
| 583 | 182 | 14,051 | 14,051 | 2,039,801 | 130,874 | 0.060292 |
| .. | .. | .. | .. | .. | .. | .. |
| 961 | 358 | 20,534 | 20,605 | 2,134,028 | 36,647 | 0.016883 |
| .. | .. | .. | .. | .. | .. | .. |
| 996 | 1,154 | 27,067 | 27,983 | 2,152833 | 17,831 | 0.008213 |

REAL TIME ADAPTIVE CONTROL OF TRANSACTION REVIEW RATE SCORE CURVE

CROSS REFERENCE TO RELATED APPLICATIONS

This application is a continuation of U.S. patent application Ser. No. 12/573,693 filed Oct. 5, 2009, and is related to U.S. patent application Ser. No. 10/142,271 filed May 8, 2002, and is related to U.S. patent application Ser. No. 09/708,124 filed Nov. 2, 2000, which are both hereby incorporated by reference in their entirety, as if fully set forth herein, for all purposes.

TECHNICAL FIELD

The present disclosure relates generally to electronic commerce transaction processing and, more specifically, to computers and techniques for evaluating fraud risk in an electronic commerce transaction.

BACKGROUND OF THE INVENTION

Any business that accepts bank or credit cards for payment accepts some amount of risk that the transaction is fraudulent. However, for most merchants the benefits of accepting credit cards outweigh the risks. Conventional "brick and mortar" merchants, as well as mail order and telephone order merchants, have enjoyed years of business expansion resulting from credit card acceptance, supported by industry safeguards and services that are designed to contain and control the risk of fraud.

Credit card transactions are being utilized in a variety of environments. In a typical environment a customer, purchaser or other user provides a merchant with a credit card, and the merchant through various means will verify whether that information is accurate. In one approach, credit card authorization is used. Generally, credit card authorization involves contacting the issuer of the credit card or its agent, typically a bank or a national credit card association, and receiving information about whether or not funds (or credit) are available for payment and whether or not the card number is valid. If the card has not been reported stolen and funds are available, the transaction is authorized. This process results in an automated response to the merchant of "Issuer Approved" or "Issuer Denied." If the merchant has received a credit card number in a "card not present" transaction, such as a telephone order or mail order, then the credit card authorization service is often augmented by other systems, but this is the responsibility of the individual merchant.

While most merchants will not accept orders that result in a response of "Issuer Denied," the automated nature of an online transaction requires merchants to implement policies and procedures that can handle instances where the card has been approved, but other data to validate a transaction is questionable. Thus, the purchaser's bank may approve the transaction, but it is not clear whether the transaction is valid.

Because significant amounts of legitimate sales are associated with unknown levels of risk, it is critical to find ways to maximize valid order acceptance with the lowest possible risk. Categorically denying such orders negatively impacts sales and customer satisfaction, while blind acceptance increases risk.

To address these issues, merchants have augmented card authorization with additional screening procedures and systems. One such additional procedure is to manually screen orders. While this approach is somewhat effective when order volume is low, the approach is inefficient and adds operating overhead that cannot scale with the business.

BRIEF DESCRIPTION OF THE DRAWINGS

In the drawings:

FIG. 12 depicts an example of a gain matrix;

DETAILED DESCRIPTION

Electronic Commerce

Figure 1:
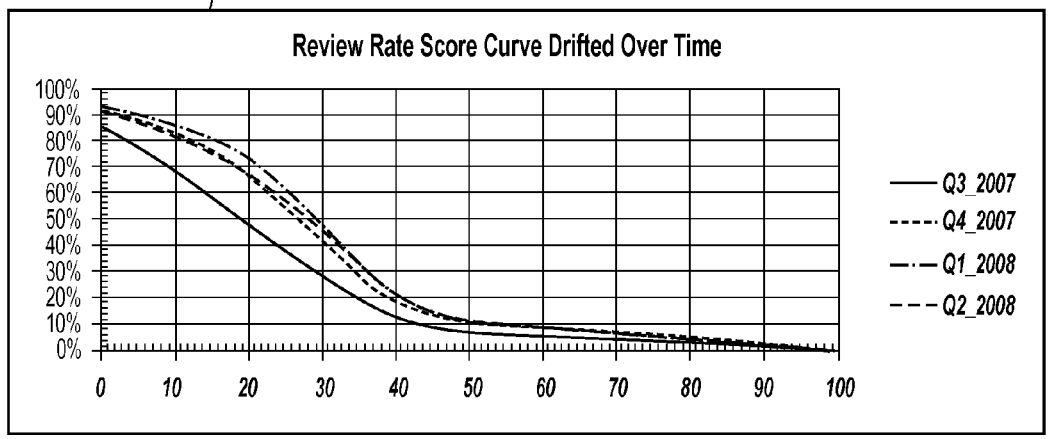
FIG. 1 illustrates a set of review rate score curves, where each review rate score curve is associated with a different time range.
Figure 1:
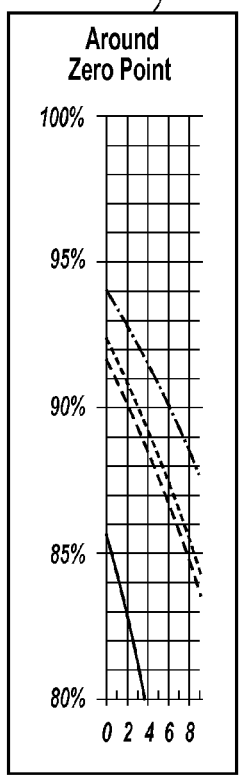
Figure 1:
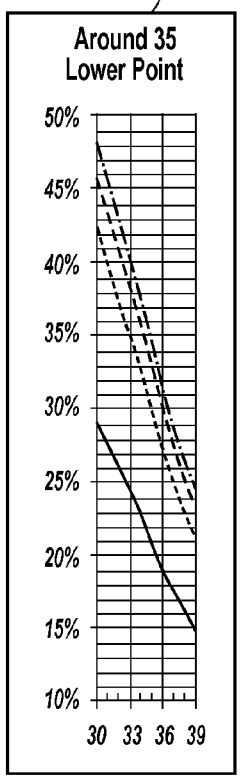
Figure 1:
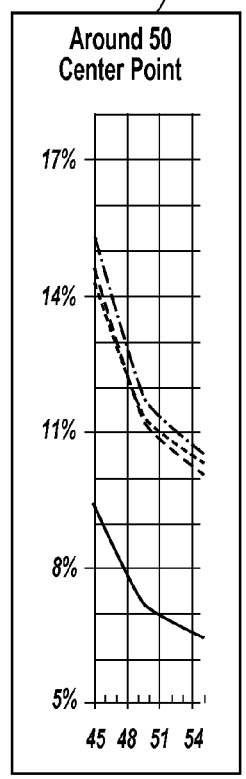
Figure 1:
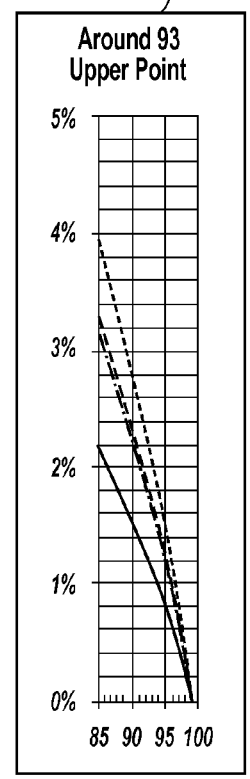

Electronic commerce or online commerce is a rapidly expanding field of retail and business-to-business commerce. In electronic commerce, a buyer or purchaser normally acquires tangible goods or digital goods or services from a merchant or the merchant's agent, in exchange for value that is transferred from the purchaser to the merchant. Electronic commerce over a public network such as the Internet requires special precautions to ensure safe business operations.

When a transaction involves transmitting information from an online service or the Internet, address and identity information are not enough to confidently verify that the customer who is purchasing the goods is actually the owner of the credit card. For example, an individual may have both the name and the address of a particular credit card holder and that information in a normal transaction may be sufficient for authorization of such a transaction. However, in an Internet transaction it is possible to obtain all the correct information related to the particular credit card holder through unscrupulous means, and therefore, carry out a fraudulent transaction.

Electronic commerce fraud is believed to be based largely on identity theft rather than stolen cards. Generally, in electronic commerce fraud that is based on identity theft, the legitimate cardholder does not detect or know that the identifying information or credit card account is being used illegally, until the cardholder reviews a monthly statement and finds fraudulent transactions. In contrast, in a stolen card case, the cardholder has lost possession of the card itself and usually notifies credit card company officials or law enforcement immediately. As a result, the impact of fraud is different in electronic commerce; it affects a merchant's operating efficiency, and possibly the merchant's discount rate and ability to accept credit cards.

In one approach, online merchants attempt to avoid this risk by declining all but the safest orders or by instituting manual screening methods. However, merchants using these approaches generally suffer business inefficiency and lost sales. These merchants turn away a significant portion of orders that could have been converted to sales, increase overhead costs, and limit business scalability. Thus both fraud and overly stringent methods or non-automated methods of protecting the business from fraud can negatively impact business operations.

Although risk-susceptible transactions can be tested in a variety of ways for risk indications, none of the resulting risk test outcomes, alone, are sufficient for determining whether the transaction should be accepted or rejected. Each test outcome must be assigned a numeric value or a weighting factor as a component of the overall transaction risk. These components must be combined and the resulting combination risk estimate transformed into a single numeric indicator which can then be used to determine whether the transaction is to be accepted for further processing or reviewed for possible rejection.

Mathematical Modeling

Mathematical models approximate the behavior of real-world processes, situations, or entities (hereinafter addressed solely as a "process," for purposes of simplicity and clarity, not for purposes of limitation). A model may be as accurate as it can be at a moment in time, but if the process that is being modeled is changing over time, a static model is likely to diverge from the real-world process that it is attempting to model. Hence, the ability of a static model to predict a real-world result degrades as a result of this divergence. Dynamic models attempt to adjust to the changes occurring to the underlying process. Often, models are adjusted in response to some form of feedback representing the changes to the underlying process. Fraudsters are actively trying to undermine predictive models to continue their fraudulent activities, by changing their process.

The Advanced Fraud Screen (AFS) model used by Cybersource Corporation, Mountain View, Calif. includes a Review Rate Score Curve, four of which are depicted in FIG. 1. While processing a transaction, the AFS model produces a raw score that indicates a level of risk or likelihood that the transaction is fraudulent. This raw score is mapped to a final score (e.g., between 0-99 as is implemented in AFS model) using an asymmetric hyper tangent function that is specified by four graphic points. The four points are referred to as "inflection points." The set of final scores for a set of transactions over time is used to generate a Review Rate Score Curve (RRSC). Each point along an RRSC indicates a percentage of a total number of transactions that are associated with the corresponding final score or higher. For example, for RRSC #1, 25% of transactions had a final score above 30. A merchant may want to manually review the top 8% most fraudulent transactions. In that case, based on RRSC #1, the merchant will want to review transactions that score higher than 47. Each of graphs 111-114 provides detail at a lower level of granularity around a different inflection point.

A merchant may want to review a set of transactions within a certain range that does not include the highest scored transactions and lowest scored transactions, as transactions that score, for example, above 80 are likely fraudulent transactions. Conversely, transactions that score, for example, 20 and below, are virtually always non-fraudulent transactions. Merchants are more likely to be interested in transactions that score in a range where the merchant may or may not accept the transactions, as merchants do not want to accept fraudulent transactions or reject non-fraudulent transactions. Such transactions are likely to have scores "in the middle"; for example, between 30 and 40. Therefore, a merchant is likely to request to review transactions with scores within that range.

However, as indicated in FIG. 1, the review rate score curve drifts over time, due in part to a change in the mix of legitimate and non-legitimate purchases and/or a change in fraudsters' activities. For example, the transaction volume changes significantly over time due to factors such as daily variations within a week (e.g., Saturday v. Monday shopping), seasonal change (Fall v. Summer), a local special event (e.g., Christmas), and transactions from new merchants being added to the system. As another example, as indicated above, fraudsters are actively trying to undermine the predictive model by changing their process to continue their fraudulent activities. In particular, fraudsters may change their activities in an attempt to cause their final score to decrease. The result of changes in final scores is reflected in the drifting of the RRSC over time, as depicted in graph 100. For some merchants, this drift in RRSC may cause either too few or too many transactions to be reviewed by merchants. If too few transactions are reviewed, merchants could accept too many fraudulent transactions, resulting in many charge backs. If too many transactions are reviewed, merchants could reject too many valid orders, resulting in loss of sales. In either case, the drift in scores and review rate, merchants are impacted negatively with increased adverse profit caused by cost of fraud loss and missed incomes caused by valid orders being rejected. Such consequences are reflected in Table 1

TABLE 1

| | Q1_2007 | Q2_2008 | Difference | Comments |
|---|---|---|---|---|
| Transactions For Review | 72 | 114 | 42 | Significantly more to review, i.e., 58% More |
| Missing Fraudulent Transactions | 20 | 22 | 2 | Number of fraudulent transactions that were missed increased 10% |
| Mistaken Non-Sell | 52 | 92 | 40 | Number of valid transactions that were rejected increased 76% |

As Table 1 indicates, due to the RRSC drift from the first quarter of 2007 to the second quarter of 2008, more transactions are reviewed, more fraudulent transactions were accepted, and more valid (or non-fraudulent) transactions were rejected.

General Overview

A method and apparatus are described for adjusting an electronic commerce transaction review rate score curve in real time. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various modifications to the described embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 2:
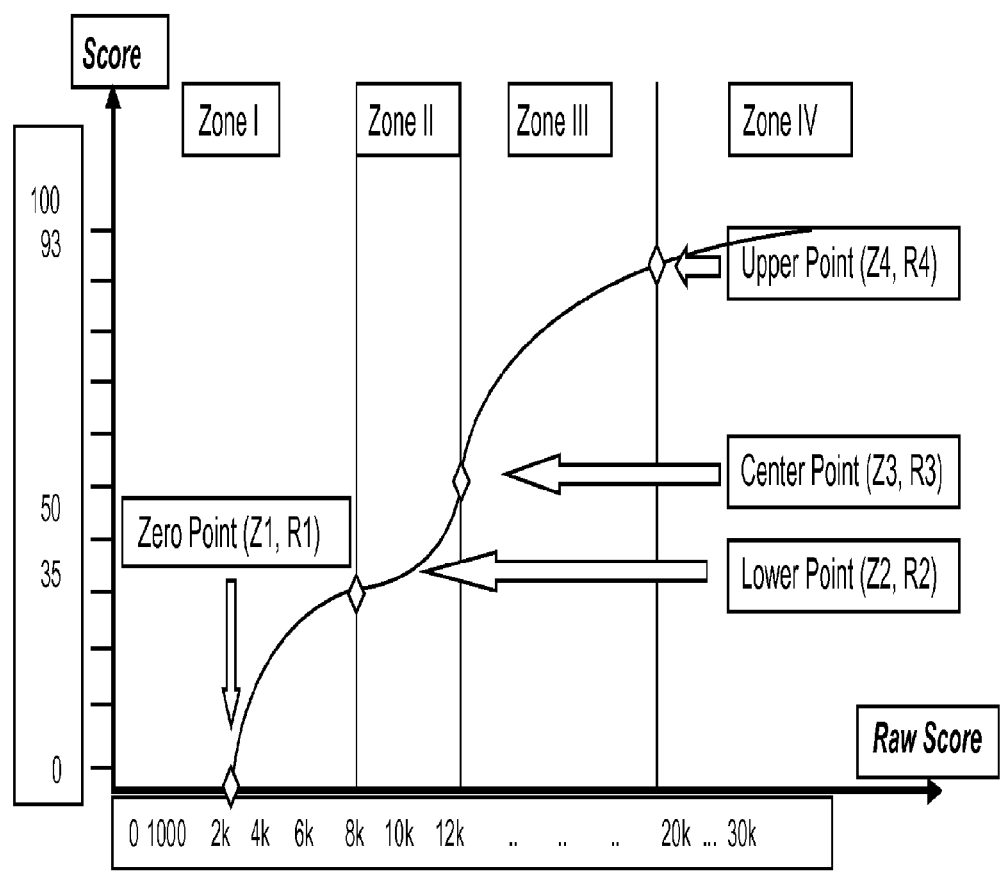
FIG. 2 illustrates four inflection points and four different risk zones that are defined by the four inflection points.

In an embodiment, digital computer logic implementing an inflection point function converts "raw" transactions scores into final scores between a particular range, for example, 0-99. The inflection point function is a type of non-linear transformation function termed an asymmetric hyper tangent function that is specified by four graphic points, known as inflection points. The inflection points define four zones, ranging from not risky to very risky. An example of the inflection points of an inflection point function and the four zones are depicted in the graph of FIG. 2. The horizontal axis corresponds to a range of possible raw scores, ranging from 0 to at least 30,000. The vertical axis corresponds to range of possible final scores, ranging from 0 to 99. As the graph in FIG. 2 depicts, the "zero" inflection point is between raw scores 2000 and 4000. The "lower" inflection point is at approximately raw score 8000. The "center" inflection point is at approximately raw score 12,000. The "upper" inflection point is near to raw score 20,000. The zones that are defined by these inflection points are referred to as Zones I, Zone II, Zone III, and Zone IV. An example of an inflection point formula is provided in Appendix A.

In an embodiment, digital computer logic comprising Proportional, Integral, and Derivative (PID) Controllers forms an electronic commerce transaction scoring computer to adjust dynamically or in real time an inflection point function to account for RRSC drift. Real time feedback adaptive control enables the logic to maintain the stability and smoothness of the RRSC. Therefore, the RRSC changes smoothly over time without radical change. Further, merchants can choose their own score threshold for reliable review rate to run their business as desired.

Functional Overview

According to an embodiment, the review rate at each inflection point is monitored over a particular time period, such as one year, using digital computer logic. The review rate may be tracked on a daily basis, weekly basis, monthly basis, or other basis. The review rate at each inflection point is coupled as an input time series to proportional (P) logic of a Proportional, Integral, and Derivative (PID) controller. A PID controller comprises, in addition to the P logic, integral (I) logic and derivative (D) logic. Each output generated by the P logic, I logic and D logic is coupled as input to a gain processor that determines a new inflection point value. The logic and the gain processor may be implemented in software, hardware, or any combination of software and hardware. In an embodiment, the P logic, I logic, and D logic may be implemented in various embodiments using a computer, one or more application-specific integrated circuits (ASICs) or other digital electronic logic, one or more computer programs, modules, objects, methods, or other software elements. For example, in one embodiment the PID controller may comprise a special-purpose computer having particular logic configured to implement the elements and functions described herein. In another embodiment, the PID controller may comprise a general purpose computer as in FIG. 14, loaded with one or more stored programs which transform the general purpose computer into a particular machine upon loading and execution.

Figure 3:
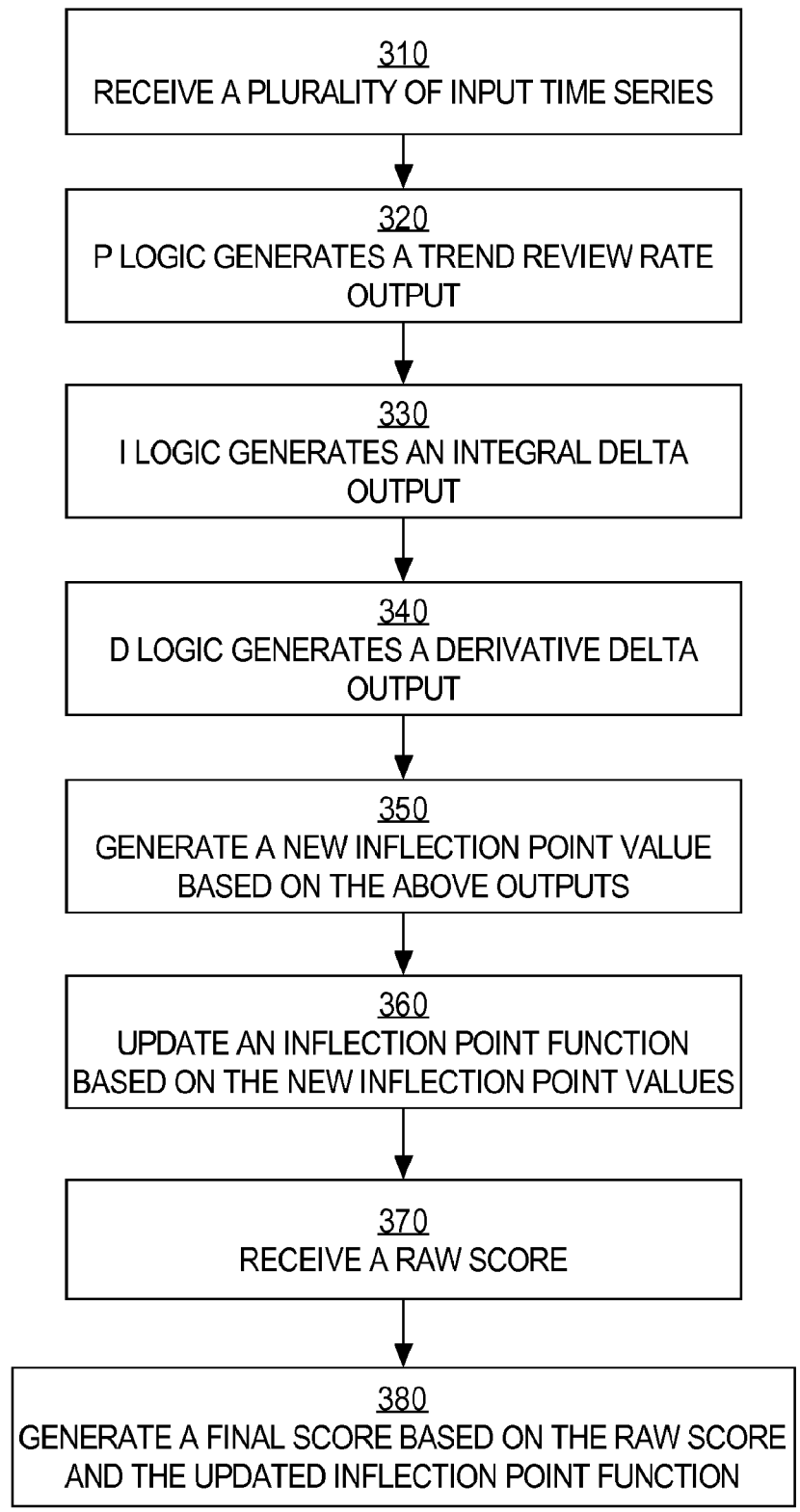
FIG. 3 illustrates a method for updating an inflection point function.

FIG. 3 illustrates a method for updating an inflection point function. In step 310, a plurality of input time series is received at a PID controller. Each input time series (a) represents a review rate and (b) corresponds to a different inflection point in the inflection point function.

In step 320, for each inflection point, P logic of the PID controller generates a trend review rate output. For example, the trend review rate may be defined according to the recursive formula: Trend_RR_at_X[n]=α*ReviewRate_at_X[n]+(1−α)*Trend_RR_at_X[n−1], where n is the sample index number, "_at_X" refers to inflection point X, α is a filter weighting factor, and 0.0<α<1.0. n=[t/T] where t is the elapsed time and T is the configured sampling duration time interval. As α decreases, the more high frequency variations are eliminated. The value of α is determined in the initial calibration. If α equals 1.0, then there is no frequency elimination at all. An α of 0.0 is meaningless.

In step 330, for each inflection point, I logic of the PID controller generates an integral delta output. For example, integral delta output may be generated based on the following convolution formula: Integral_Delta_at_X[n]=1/(Total$_{Wt}$)*

$$\int_{1}^{n} Wt(n-s) * \text{Scatter\_RR\_at\_X}[s] \, ds$$

where, Scatter_RR_at_X[s] represents the cumulative divergence between the review rate and the trend review rate at a particular inflection point, $$\text{Total}_{Wt} = \int_{1}^{n} Wt(s) \, ds, \; Wt(s) = e^{-k}, \text{ and } k = (1/\lambda) * s^2.$$

As λ increases, less weight is given to more recent review rate data and more weight is given to older review rate data. λ is a non zero positive number.

In step 340, for each inflection point, D logic of the PID controller generates a derivative delta output, which represents the intensity of the adjustment of the trend review rate. For example, derivative delta output may be defined as the derivative of a tilt scatter review rate, where: Tilt_Scatter_RR_at_X[n]=β*Comp_Scatter_RR_at_X[n]+(1.0−β)*Tilt_Scatter_RR_at_X[n−1] and where β is an exponential filter coefficient. Comp_Scatter_RR_at_X[n] may be defined as Comp_Scatter_RR_at_X[n]=Scatter_RR_at_X[n]−Integral_Delta_at_X[n].

In step 350, based at least in part on the trend review rate output, the integral delta output, and the derivative delta output, the PID controller generates a new inflection point value for the inflection point that corresponds to the each input time series.

In step 360, the PID controller adjusts the inflection point function based on each of the new inflection point values to generate an updated inflection point function. In step 370, a raw score that represents a fraud risk of a particular electronic commerce transaction is received.

In step 380, a final score for the particular electronic commerce transaction is generated and stored. The final score is based at least in part on the raw score and the updated inflection point function.

Example System Architecture

Figure 4:
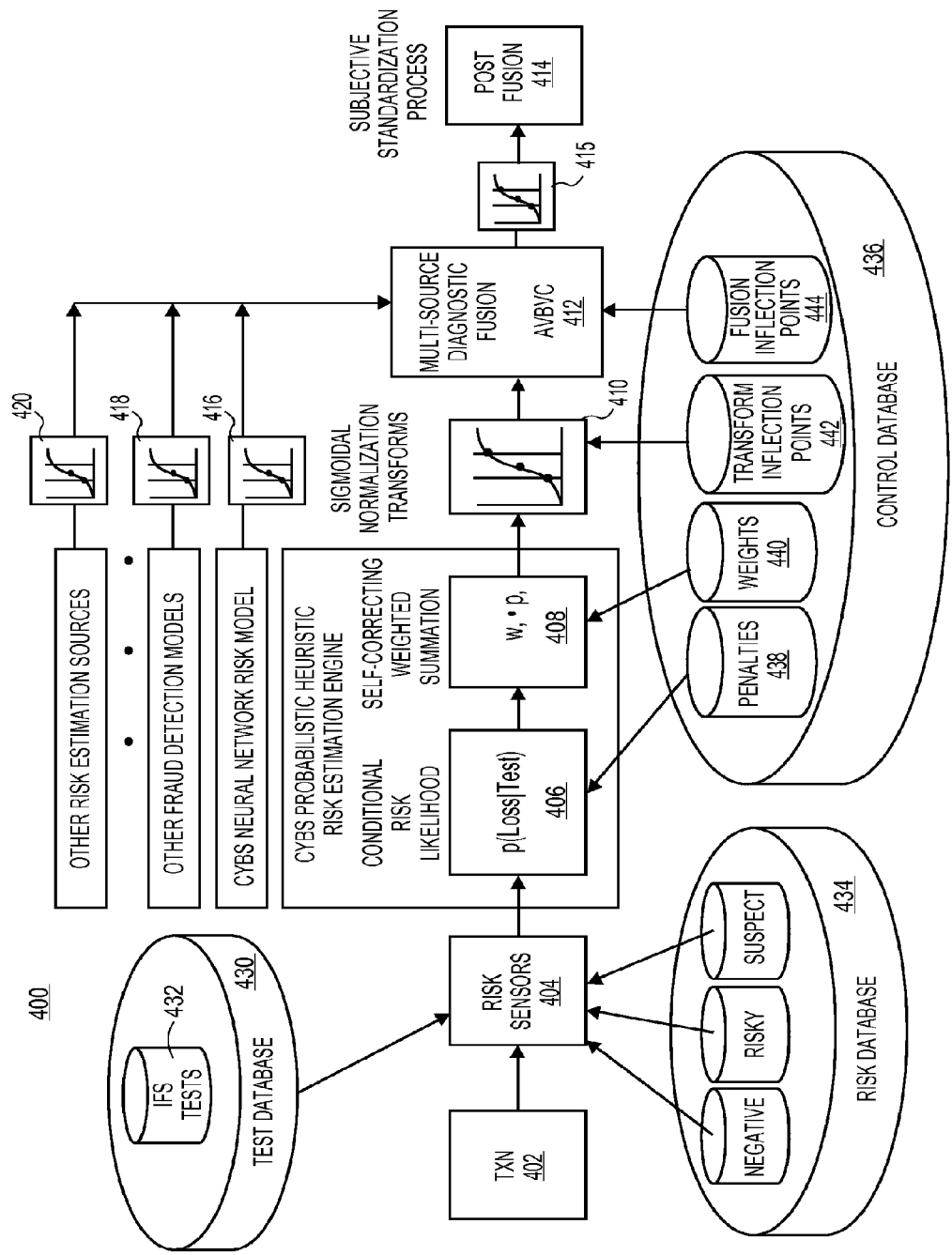
FIG. 4 illustrates an example transaction risk assessment system.

FIG. 4 illustrates an example transaction risk assessment system 400 and the role that inflection points has in that system. Transactions to be evaluated, denoted by TXN block 402, enter the system and are subjected to analysis by a number of individual risk tests that are carried out by risk sensors 404. Input to risk sensors 404 may include transactions in a test database 430, such as fraud screening system transactions 432. Risk sensors 404 also are guided by information in a risk database 434 that includes examples of negative transactions, risky transactions, and suspect transactions. Each model in the system includes multiple risk tests, as described above.

Each risk test that alarms on a given transaction contributes a balanced probabilistic risk penalty, which is the conditional risk likelihood associated with that test in the presence of the transaction. As indicated by block 406, a determination of the risk penalty value for a risk test is made, which, in general, is the likelihood of risk balanced against the likelihood of non-risk given that an individual Risk Test alarmed. Such determination may be computed as p(Loss|Test), wherein a risk penalty value p is the likelihood of loss given the alarming of a particular test. Penalty values 438 from control database 436 may contribute to the determination at block 406. In one embodiment, the risk penalty for a given risk test i is determined according to the equation: $p_i=1.0/(1.0+\text{False Positive Ratio of test } i)$.

The risk penalties that are determined for the multiple tests within a given model are weighted at block 408 (Self-Correcting Weighted Summation) using weight values 440 from control database 436, and summed, resulting in creating and storing a summation value. In one embodiment, an adjusted weighted risk sum of risk penalties for a given model is determined according to the equation: $\Sigma w_i c_i p_i$.

The adjusted weighted risk sum is output from a given model and transformed into probabilistic decision space through the use of a sigmoidal transform function, as indicated by block 410 (Sigmoidal Normalization Transform). Values for transform inflection points 442 are obtained from control database 436. As illustrated in FIG. 4, risk assessment system 400 can have multiple constituent risk models, with different processes and algorithms running as part of each model. The methods presented above for computation of the risk penalties and the weighted summations are but one of multiple possible implementations. Therefore, the scope of the invention is not limited to any particular fraud risk assessment model, or limited to any particular algorithms or processes within a particular model.

The resulting risk likelihood estimates computed from the fraud risk assessment models are then integrated with any number of other such risk estimates through a process of Multi-Source Diagnostic Fusion, as indicated by block 412. In one embodiment, the fusion process is as described in U.S. patent application Ser. No. 10/142,271, which is incorporated by reference as if fully set forth herein. Fusion inflection points 444 contribute to multi-source diagnostic fusion in block 412. Before conducting the multi-source diagnostic fusion (in block 412), fusion inflection points 444 are used to regulate review rate for each of the multiple sources, respectively.

The other models computing risk estimates may include, as non-limiting examples, a CyberSource neural network risk model 416, other fraud detection model(s) 418, and any number of other risk estimation sources 420. Typically, a different sigmoidal normalization transform 410 is derived for each model 415, 416, 418, and 420. However, the invention is not limited to use of different normalization transforms for the different models.

Furthermore, in one embodiment, a post-fusion transformation 414 is performed on the fused single point risk estimate according to another sigmoidal transform function, to optimize the single point risk estimate even further toward the real-world decision domain. Values for transform inflection points for post-fusion transformation 414 are also typically obtained from control database 436. The post-fusion transform inflection points may, or may not, be equivalent to various transform inflection points 442 used for the sigmoidal normalization transforms 410. The resulting multi-source risk estimate is compared against expectation minimums during a post fusion process 416, whereby the maximum can serve as the final risk estimate for the transaction risk assessment system 400.

In this approach, test penalties are statistically derived from actuarial data to reflect the actual probabilistic risk of loss given that the test alarmed. This probabilistic risk of loss includes both negative losses (due to fraud, non-payment, etc) and positive losses (due to lost profit opportunities). Thus, the test penalties reflect the actual risk to the merchant in relation to each transaction that alarms a test.

Individual fraud risk assessment models can be maintained as weight vectors. Thus, models can be maintained to reflect the risks associated with categories of goods sold, geographic delivery locations, merchant groups, or even individual merchants. Furthermore, weighted summations of risk carry the unwanted side effect that a plurality of small risk likelihood values will add up, creating an artificial appearance of high risk. The self-correcting feature of the weighted summation eliminates this error.

Sigmoidal score transformations (e.g., Sigmoidal Normalization Transform 410), multi-source diagnostic fusion 412, and post-fusion transformation 414 depend on the creation of a multi-dimensional surface with adjustable inflection points. The inflection points and the resulting sigmoidal surfaces are superimposed onto the underlying decision domain through a set of dynamically adjustable "inflection points", allowing the modeler to fit the sigmoidal surface directly onto the domain of interest. Common sigmoidal transforms do not have the flexibility to fit underlying task domains in this way. In this approach, individual score transformation patterns are maintained as a simple vector of three (x, y) points in raw-score-input by transformed-score-output space. This allows fine-tuning of the important relationship between review rate, risk detection rate, and false positive ratio.

In the same way, the multi-source fusion process is tailored to the decision domain. Because of the shifting nature of adversarial modeling, it is necessary to constantly adjust the fusion proportions of a multi-source model. The dynamically adjustable inflection points of the multi-source n-dimensional sigmoidal surface allow its fusion proportions to be dynamically adjusted to remain in optimal register with the problem domain.

Overview of Review Rate Score Curve Control

Figure 5:
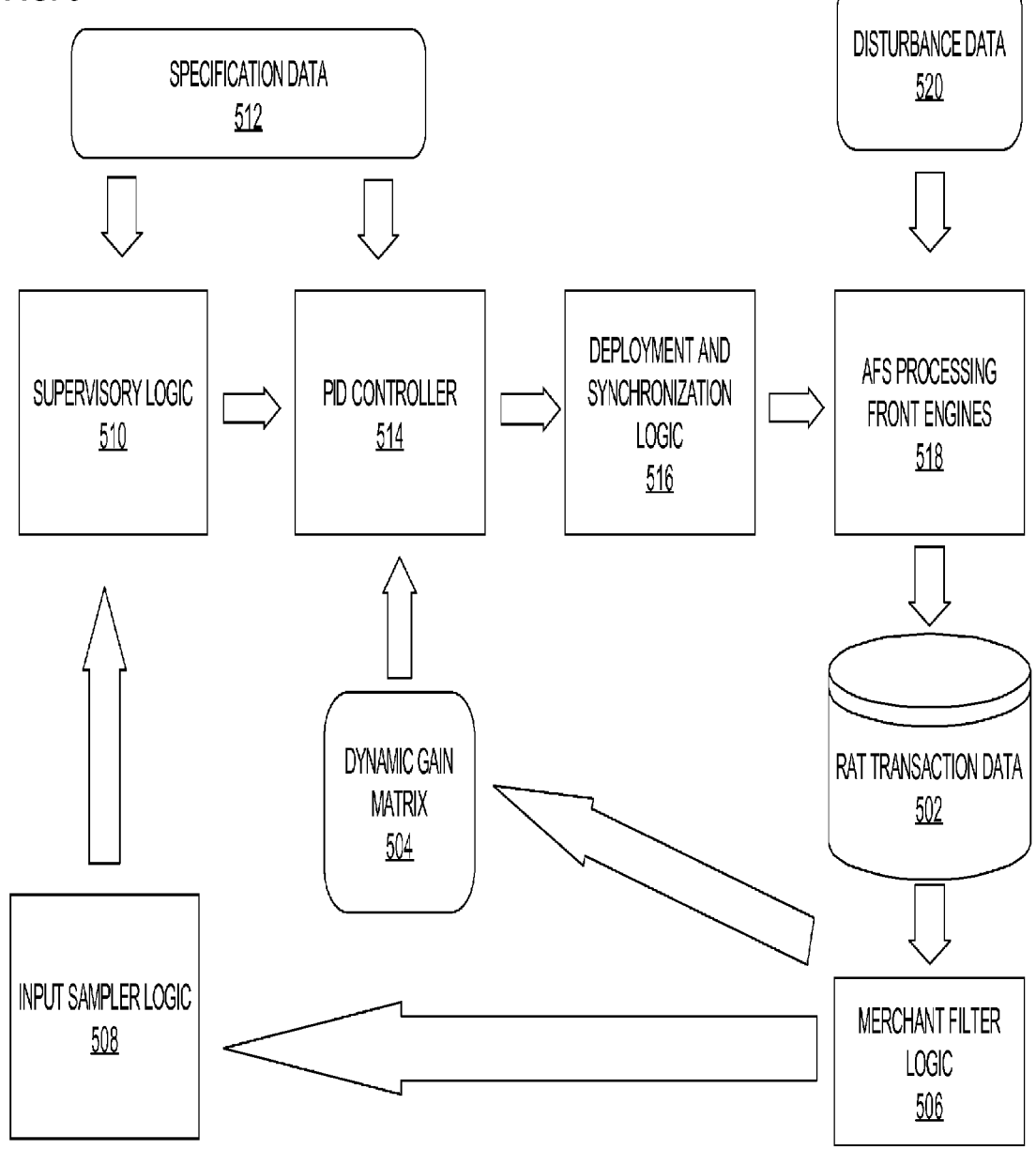
FIG. 5 illustrates an overview of how a review rate score curve may be controlled.

FIG. 5 illustrates an overview of how a review rate score curve (RRSC) may be controlled. RAT transaction data 502 is the source of data for dynamic gain matrix 504. RAT refers to "Risk Analysis Tools," which is a suite of data processing and analysis tools. RAT is also used (as in this case) to refer to a historical data warehouse that contains past transaction data for doing analysis. Transaction data 502 comprises transaction information that includes, for each transaction, a risk score that was assigned to that transaction. Dynamic gain matrix establishes a relationship between raw scores and the review rate score. Dynamic gain matrix 504 is described in more detail below.

Merchant filter logic 506 filters out, from transaction data 502, transactions that are associated with certain merchant identifiers. The shopping behavior of merchants that correspond to those merchant identifiers are not yet established. Some new merchants may be associated with certain transaction traffic that is not representative of the other of the merchants in the aggregate. Such new merchants might significantly skew the RRSC.

Transaction data 502 is also the source of data for input sampler logic 508. Input sampler logic 508 may sample transaction data 502 at a different rates, e.g., daily or weekly. From the sampled transaction data, input sampler logic 508 generates multiple time series inputs that each represents a review rate score curve (RRSC) for a different inflection point. Non-limiting examples of such time series include review rate, trend review rate, scatter review rate, tilt review rate, integral delta output and derivative delta output, each of which is described in more detail below. Each time series inputs serves as input to supervisory logic 510, which may modify each time series input before the time series inputs are provided to PID controller 514. Supervisory logic 510 is described in more detail below. Alternatively, each time series input bypasses supervisory logic 510 and serves as direct input to PID controller 514.

Specification data 512 also serves as input to supervisory logic 510. Specification data 512 specifies a desired review rate target for each of one or more actual review rates. The targets may be used to modify one or more of the time series inputs. The targets are configured to support the logic in PID controller 514.

PID controller 514 generates, for each inflection point, an inflection point value that will be used to modify the inflection point function. PID controller 514 is described in more detail below. The inflection point values produced by PID controller 514 serve as input to deployment and synchronization logic 516. A main consideration of deployment and synchronization logic 516 is primarily from an implementation point of view. A dedicated hardware server may be used independently to process all control procedures away from the production core hardware, referred to herein as AFS system 518, which is a "live" real-time. Results (such as new inflection points) of control are deployed to AFS system 518.

Disturbance data 520 serves as input to AFS system 518. Disturbance causes the score curve distribution to change and, as a result of that review rate change, the score curve distribution should be corrected if the changes are significant. Disturbance may be categorized as environmental change caused by market trend, seasonal and local events, and fraudulent shopping behavior change.

PID Controller

Figure 6:
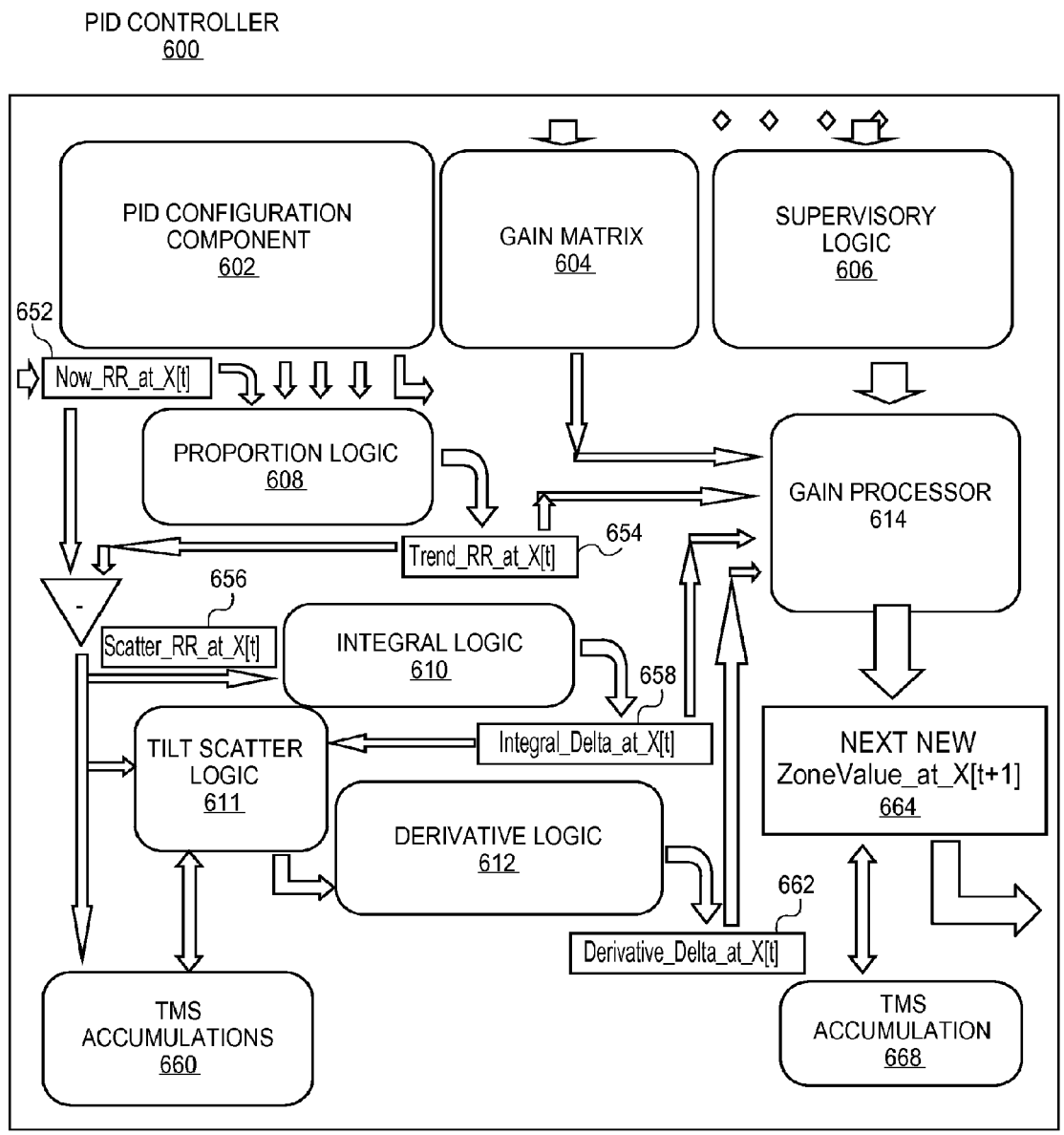
FIG. 6 illustrates a Proportional, Integral, Derivative (PID) Controller.

FIG. 6 illustrates a PID controller 600 that corresponds to MD controller 514 of FIG. 5. PID controller 600 comprises multiple components 602-614, 660 and 668.

PID configuration component 602 comprises coefficients for one or more logic units of PID controller 600. The coefficients are used to regulate the behavior of controller 600. For example, the digital filter could screen out high frequency noise more heavily with a coefficient value 0.2 than 0.35.

Gain matrix 604 (illustrated in FIG. 12) is a matrix of values that specify the relationship between the review rate and the raw score. Gain matrix 604 is used to determine a review rate given a raw score, and vice versa. Gain matrix 604 is described in more detail below.

Supervisory logic 606 corresponds to supervisory logic 510 of FIG. 5. Supervisory logic 606 may modify the review rate for a particular inflection point before the review rate is used as input to gain processor 614.

Gain processor 614 generates a new inflection point value 664 based on input from each of logic 608-612, gain matrix 604, and, optionally, supervisory logic 606.

Figure 9:
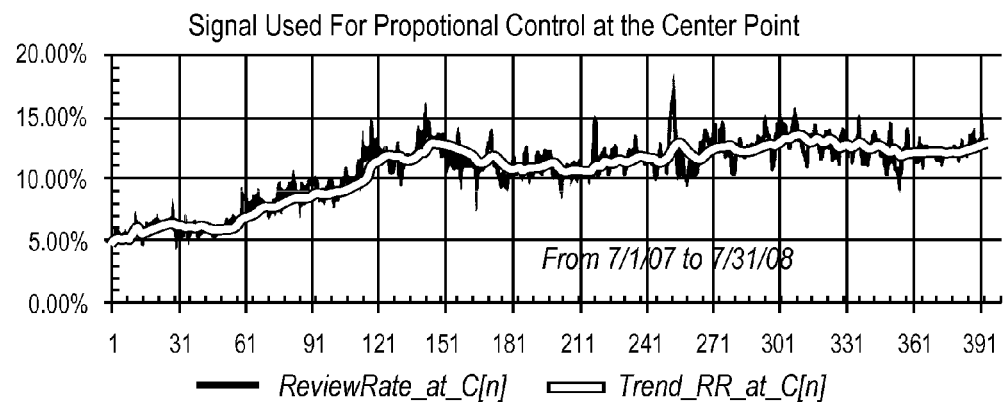
FIG. 9 illustrates a trend review rate.
Figure 9:
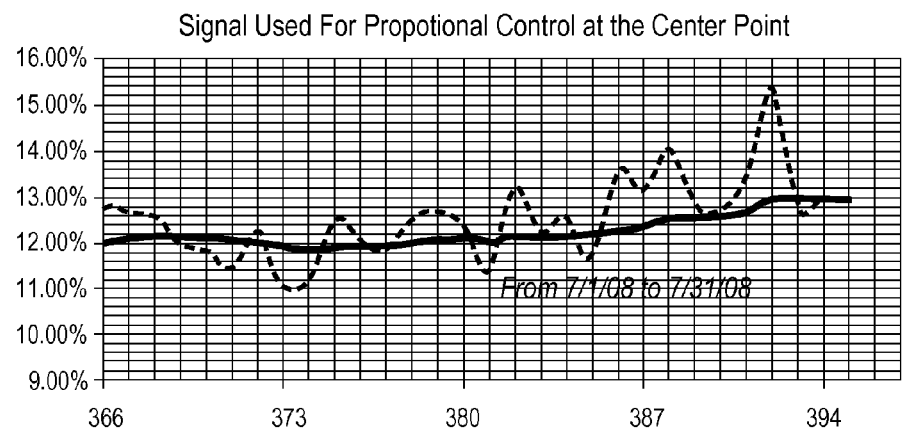

A review rate 652 at a particular inflection point is monitored and becomes input to Proportional (P) logic 608 (described in more detail in relation to FIG. 9). P logic 608 generates, based on the review rate for a particular inflection point, a trend review rate 654 as output. Trend review rate 654 is coupled as input to gain processor 614.

Figure 10A:
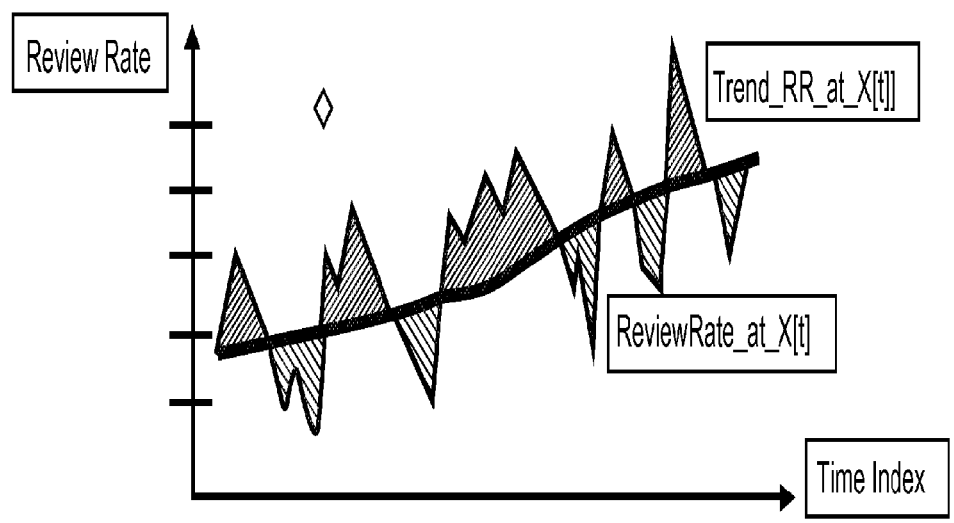
FIG. 10A illustrates a scatter review rate over time as a difference between a trend review rate and an actual review rate upon which the trend review rate is based.
Figure 10A:
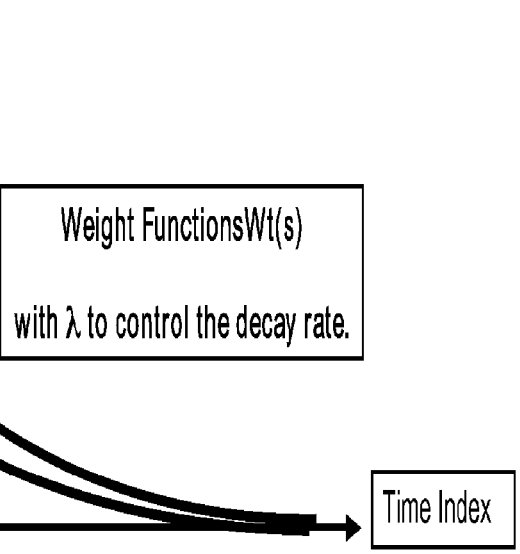
Figure 10B:
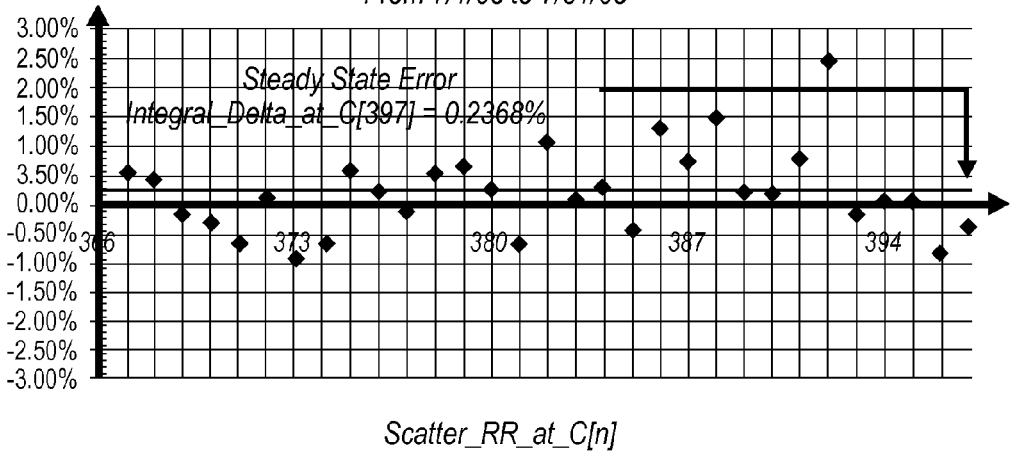
FIG. 10B illustrates a scatter review rate as a set of points along a particular range of time.
Figure 10B:
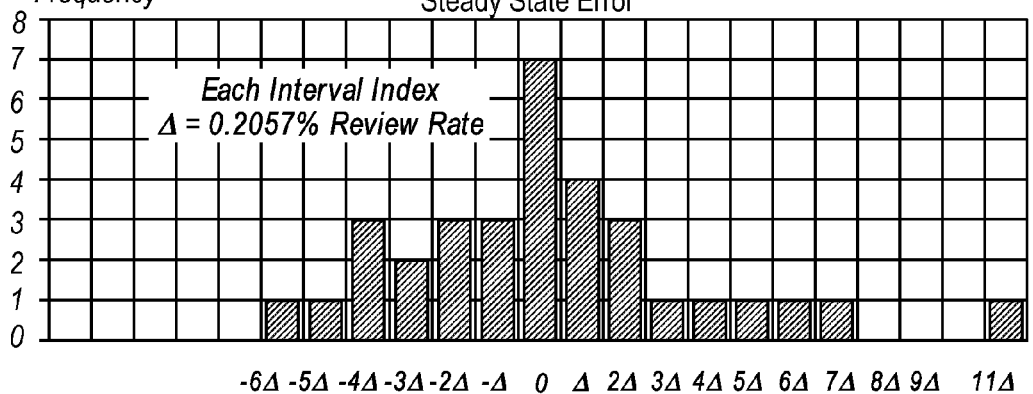

Review rate 652 for that particular inflection point is combined with trend review rate 654 to produce a scatter review rate 656, which is coupled as input to Integral (I) logic 610 (described in more detail in relation to FIGS. 10A-B). I logic 610 generates, based on scatter review rate 656, an integral delta output 658. Integral delta output 658 is coupled as input to gain processor 614.

Scatter review rate 656 and integral delta output 658 are coupled as input to Tilt scatter logic 611. Tilt scatter logic 611 generates a tilt scatter review rate, which is coupled as input to Derivative logic 612. The tilt scatter review rate corresponding to a particular inflection point is described in more detail below in conjunction with Derivative logic 612.

Derivative (D) logic 612 (described in more detail in relation to FIG. 11) uses scatter review rate 656 and the integral delta output 658 to generate a derivative delta output 662. Derivative delta output 662 is coupled as input to gain processor 614.

Time series (TMS) accumulations 660 contains various time series, such as trend review rate 654, scatter review rate 656, integral delta output 658, a tilt scatter review rate, and derivative delta output 662.

TMS (or time series) accumulation 668 contains, for each inflection point, a new inflection point value that gain processor 614 generates.

Time Series Inputs

Figure 7A:
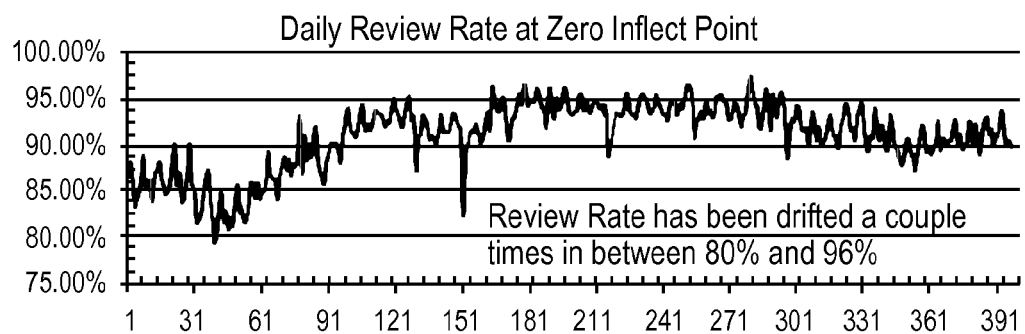
FIG. 7A and FIG. 7B illustrate four different graphs, based on four different time series, that depict the review rate at the different inflection points.
Figure 7A:
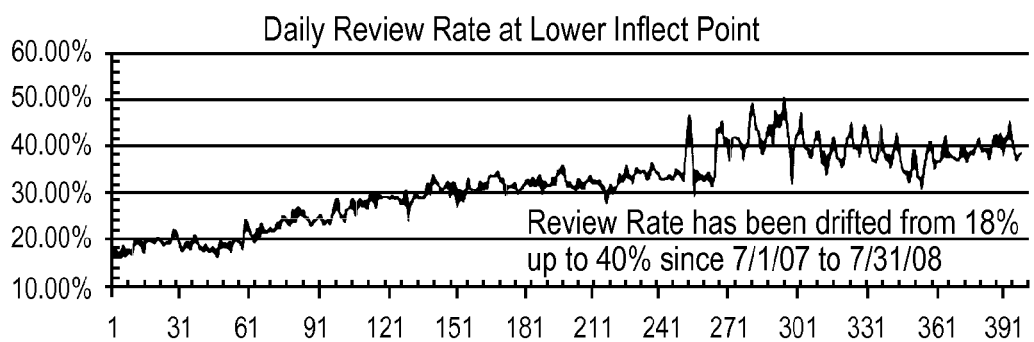
Figure 7B:
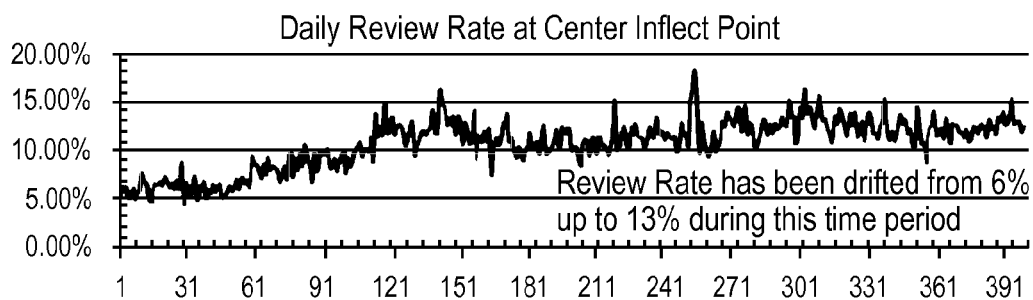
Figure 7B:
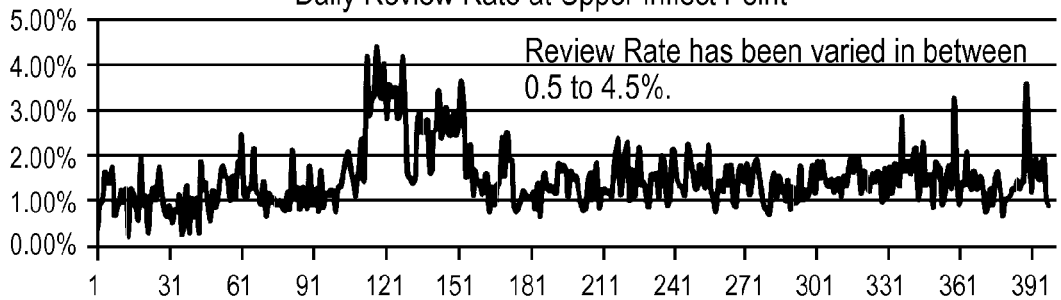

FIG. 7A and FIG. 7B illustrate four different graphs based on four different time series inputs. In an embodiment, each of graphs 710-740 represents output signals corresponding to a different inflection point of an inflection point function. Each of graphs 610-640 depicts the daily review rate over a period of approximately 13 months. In other embodiments, each time series input may be based on a weekly review rate over the same 13 month period or a different period. Embodiments include any range for each time series input and any frequency of the review rate (e.g., daily, weekly, monthly) for each time series input.

Graph 710 depicts a daily review rate at the zero inflection point (i.e., final score of 0). Graph 720 depicts a daily review rate at the lower inflection point (e.g., final score of 45). Graph 730 depicts a daily review rate at the center inflection point (e.g., final score of 50). Graph 740 depicts a daily review rate at the upper inflection point (e.g., final score of 93).

As each graph depicts, the review rate around the corresponding respective inflection points is constantly changing. In this example, the review rate at each inflection point has drifted upward, at least slightly. Each of these time series may be coupled as an input into P logic 608 of PID controller 600.

Supervisory Control Logic

As indicated in FIG. 5, supervisory control logic 510 may be applied to one or more time series inputs before the time series inputs are provided to P logic 608 of PID controller 600. One purpose of the supervisory control logic is to maintain the smoothness of the RRSC. The supervisory control logic may, depending on the circumstances, adjust one or more inflection points to new target values, prevent the inflection points from adjusting, issue an alarm, or schedule maintenance by updating gain matrix 604. Issuing an alarm may occur, for example, when the new transaction volume is too small or too large, when an inconsistency among the time series of inputs is detected, and when the review rate is outside an allowable range. The supervisory control logic may also adjust a review rate upward or downward to avoid possible positive or negative spikes in the input time series.

Figure 8:
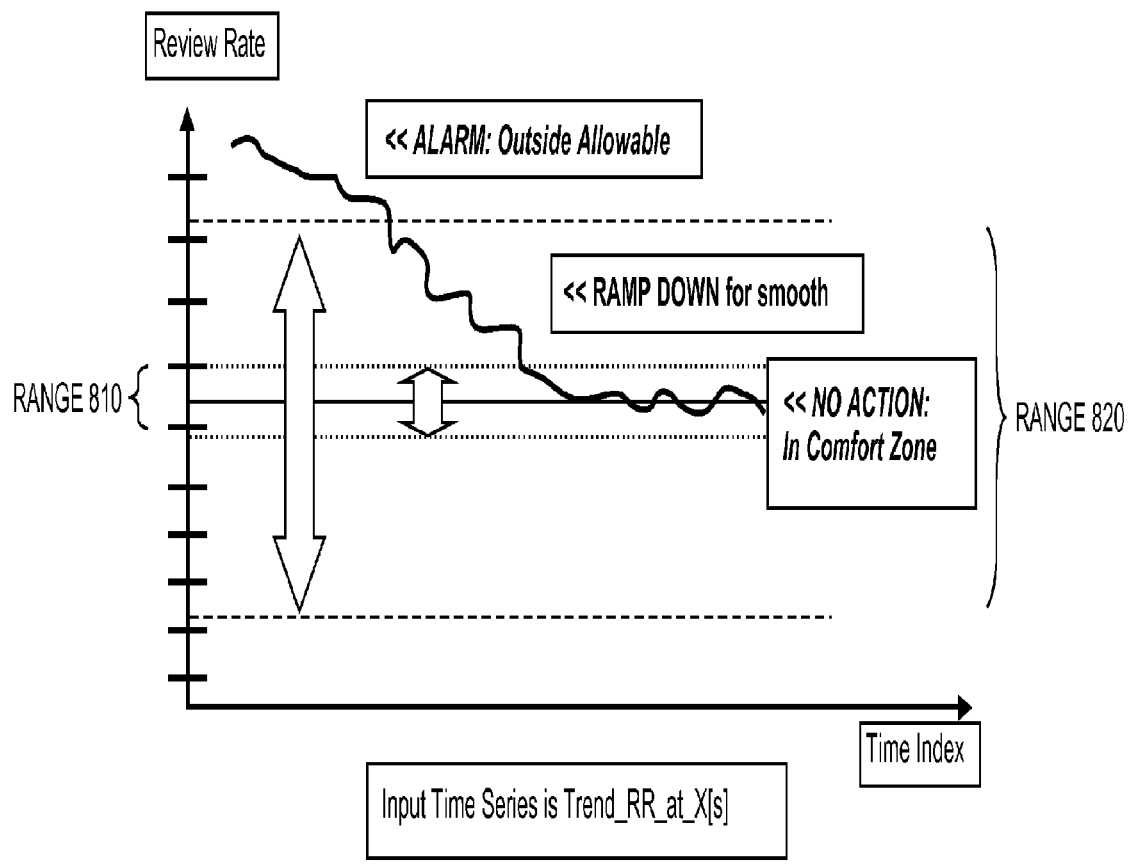
FIG. 8 illustrates how supervisory control may adjust a review rate.

FIG. 8 includes a graph 800 that depicts how output signals from the supervisory control logic may adjust a review rate based on an input time series, such as Trend_RR_at_X[n]. Graph 800 comprises a number of ranges. Range 810 indicates a "comfort zone" wherein supervisory control logic 460 performs no significant action (e.g., issuing an alarm or adjusting the review rate) as long as the review rate is within that range. Range 820 indicates another review rate range. If the review rate is outside range 820, then the supervisory control logic issues an alarm. If the review rate is within range 820 but not within range 810, then the supervisory control logic will adjust the review rate downward (i.e., if the review rate is above the comfort zone) or upward (i.e., if the review rate is below the comfort zone).

PID Controller

Proportional Logic

P logic 608 generates a trend review rate as an output signal. The trend review rate at a particular inflection point represents a smoothed view of the corresponding actual review rate at that inflection point. The trend review rate may be defined according to the following recursive formula:

Trend_RR_at_X[n]=α*ReviewRate_at_X[n]+
(1−α)*Trend_RR_at_X[n−1]

where n is the sample index number, "_at_X" refers to inflection point X, α is a filter weighting factor, and 0.0<α<1.0. n=[t/T] where t is the elapsed time and T is the configured sampling duration time interval. As α decreases, the more high frequency variations are eliminated. The value of α is determined in the initial calibration. If α equals 1.0, then there is no frequency elimination at all. An α of 0.0 is meaningless. The formula may be implemented using digital logic in P logic 608.

An alternative, non-recursive version of the above formula is the following:

Trend_RR_at_X[n] =

$$\sum_{1}^{n} \alpha * (1-\alpha)^{n-k} * \text{ReviewRate\_at\_X}[k] + (1-\alpha)^n * \text{ReviewRate\_at\_X}[0]$$

In this example, more weight is assigned for relatively recent inputs. The weight declines exponentially for more historic input readings. Embodiments of the invention may also include logic implementing formulas that are similar to or derivable from one of the above formulas.

FIG. 9 includes graph 910 that depicts the review rate at the center inflection point. The review rate at the center inflection point is also depicted in FIG. 7B. Graph 910 also includes the trend review rate that P logic 608 generates as an output signal based on that center inflection point input review rate. In this example, the coefficient α is 0.1. Graph 920 depicts a portion of the same data as in graph 910, except at a lower level of granularity.

If only the trend review rate generated by P logic 608 were used to modify the inflection points, then certain undesirable side effects might result. Such side effects include (1) steady state error and (2) overshoot and under reach actions. Such side effects are compensated or prevented by I logic 610 and D logic 612, respectively.

PID Controller

Integral Logic

I logic 610 receives scatter review rate 656 as input. Scatter review rate 656 for a particular inflection point may be derived by subtracting trend review rate 654 for the same inflection point from review rate 652 (e.g., ReviewRate_at_X[n]−Trend_RR_at_X[n]). PID controller 600 includes logic (not shown in FIG. 6) that determines Scatter_RR_at_X.

Scatter review rate 656 represents the cumulative divergence between review rate 652 and trend review rate 654 at a particular inflection point. I logic 610 generates, based on scatter review rate 656, one or more integral delta output signals 658, which represents how much trend review rate 654 should be adjusted.

Integral delta output 658 may be generated based on the following convolution formula:

$$\text{Integral\_Delta\_at\_X}[n] = 1/(Total_{Wt}) * \int_1^n Wt(n-s) * \text{Scatter\_RR\_at\_X}[s]\,ds$$

where $$Total_{Wt} = \int_1^n Wt(s)\,ds,\ Wt(s) = e^{-k},\ \text{and}\ k = (1/\lambda) * s^2.$$

As λ increases, less weight is given to more recent review rate data and more weight is given to older review rate data. Graph 1020 in FIG. 10A depicts this effect on Wt(s) as λ increases.

FIG. 10A also includes graph 1010 that depicts a scatter review rate over time as a difference between a trend review rate and an actual review rate upon which the trend review rate is based. In an embodiment, shaded regions above the trend review rate line indicate an amount of review rate that was under connected by the trend review rate, whereas the shaded regions below the trend review rate line indicate an amount of review rate that was over corrected by the trend review rate. The summation of the shared regions above and below the trend review rate line is reflected in the following portion of the above formula:

$$\int_1^n \ldots \text{Scatter\_RR\_at\_X}[s]\,ds.$$

FIG. 10B includes a plot and line graph 1030 that depicts a scatter review rate, for the center inflection point, as a set of points along a range of time that corresponds to the range of time in graph 920 of FIG. 9. The line above the x-axis is the integral delta output generated by I logic 610. In this example, the integral delta output indicates that P logic 608 "under corrected." Graph 1030 provides an indication of the accuracy of the trend review rate generated by P logic 608.

The difference between the integral delta output and the x-axis is referred to herein as the steady state error. In the example depicted in FIG. 10B, the steady state error is 0.2368%.

FIG. 10B also includes a bar graph 1040 that depicts the frequency of the difference (in set intervals) between the scatter review rate and the steady state error in the time range reflected in graph 1030. In this example, the interval is 0.2057%. As graph 1040 indicates, there are seven occurrences (or days to be precise) in which the scatter review rate was within 0.2057% of the steady state error.

Derivative Logic

As indicated above, D logic 612 takes scatter review rate 656 and integral delta output 658 as input and generates a derivative delta output 662 for a particular inflection point. Derivative delta output 662 represents the intensity of the adjustment of the trend review rate 654. Derivative delta output 662 may be defined as the derivative of a tilt scatter review rate, where:

$$Tilt\_Scatter\_RR\_at\_X[n] = \beta * Comp\_Scatter\_RR\_at\_X[n] + (1.0 - \beta) * Comp\_Scatter\_RR\_at\_X[n-1]$$

and where $\beta$ is an exponential filter coefficient. Comp_Scatter_RR_at_X[n] may be defined as:

$$Comp\_Scatter\_RR\_at\_X[n] = Scatter\_RR\_at\_X[n] - Integral\_Delta\_at\_X[n].$$

Figure 11:
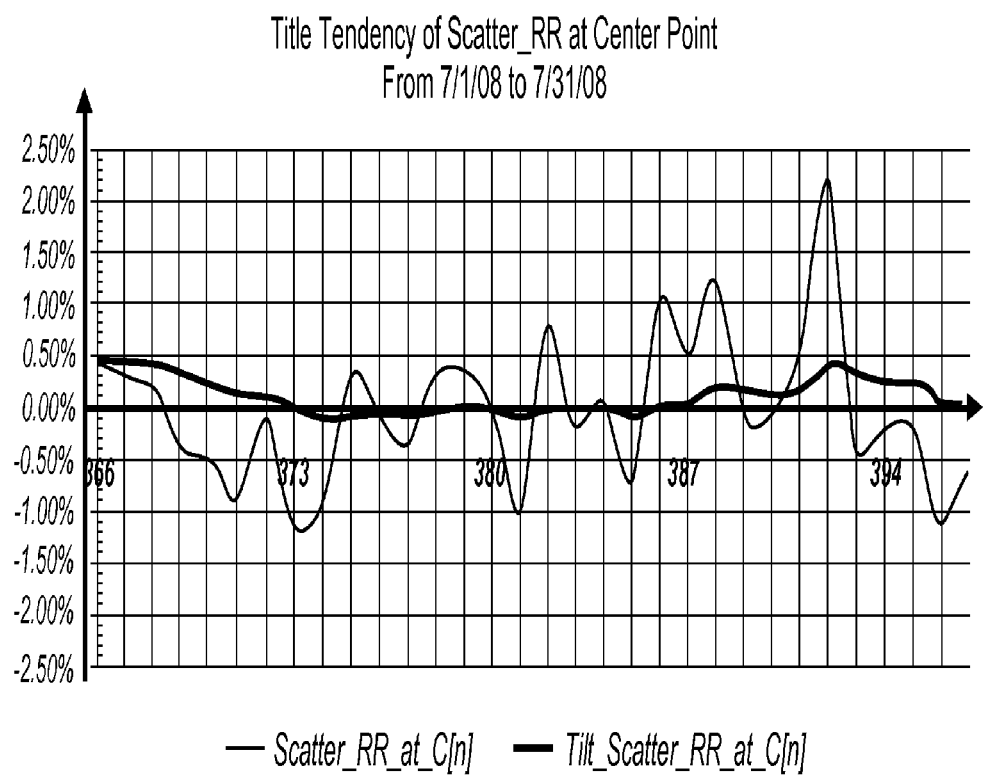
FIG. 11 illustrates a scatter review rate, for the center inflection point.

FIG. 11 includes a line graph 1110 that depicts a scatter review rate, for the center inflection point. In an embodiment, the scatter review rate corresponds to the range of time in graph 920 of FIG. 9 and graph 1030 of FIG. 10B. Graph 1110 also depicts a tilt scatter review rate. The tilt scatter review rate is a smoothed interpolation of the scatter review rate.

Derivative delta output 662 is generated for each inflection point.

In review, trend review rate 654 represents a smoothed view of the actual review rate 652, integral delta output 658 represents how much trend review rate 654 should be adjusted, and derivative delta output 662 represents the intensity of that adjustment.

Gain Matrix

Gain matrix 604 may comprise a matrix of values stored in digital logic or memory and that represents the relationship between the review rate and the raw score. At least a portion of gain matrix 604 is a numeric representation of the review rate score curve, such as the RRSC depicted in FIG. 2. FIG. 12 is a diagram that depicts an example of gain matrix 604. In the example of FIG. 12, gain matrix 604 is a 1000×8 matrix or table. The 1000 "rows" define a different range of raw scores. The eight "columns" indicate, respectively, a risk rank, a rank frequency, a lower raw score, an upper raw score, an accumulated frequency, a frequency remainder, and a review rate. As the risk rank increases, the range of raw scores that are defined by the corresponding lower and upper raw scores also increases.

The rank frequency of a particular risk rank indicates a number of times a transaction received a raw score within the corresponding raw score range. The accumulated frequency indicates a number of transactions that are associated with the corresponding risk rank or a lower risk rank. The frequency remainder indicates a number of transactions that are associated with a risk rank that is higher than the corresponding risk rank. Therefore, the summation of the accumulated frequency and the frequency remainder in one row of gain matrix 604 equals the summation of the accumulated frequency and the frequency remainder in each other row in gain matrix 604. The review rate indicates the result of dividing the accumulated frequency by the frequency remainder.

Gain matrix 604 is generated based on a set of inflection points and a history of transactions over a period of time, e.g., one month. As the granularity of gain matrix 604 increases, the greater the ability to finely control and adjust the inflection points. In other words, as the number of possible risk ranks increase (e.g., from 500 to 1000 as in gain matrix 604), the adjustment in the inflection points becomes more precise. Due to the relatively high number of risk rankings, gain matrix 604 is sensitive on location on the review rate score curve and direction chosen to increase or decrease with backlash and the whole matrix contents changing as time goes by.

In an embodiment of the invention, gain matrix 604 is generated using a transform function that converts a raw score into, in this example, 1000 risk ranks. The conversion is based on the given inflection points and a sampling of raw scores from a set of transactions (e.g., transactions from the most recent month). Appendix B sets forth an example transform function.

Gain Processor

Gain processor 614 may comprise digital computer logic which when executed determines a new inflection point value or signal from a previous inflection point value or signal based on inputs such as (1) the previous inflection point, (2) outputs from each of P logic 608, I logic 610, and D logic 612 for that previous inflection point, and (3) gain matrix 604. The following formula is an example of how each of these inputs may be combined to determine a new inflection point value for one of the four inflection points X:

$$ZoneValue\_at\_X[t+1] = GainRScore\{GainRRate[ZoneValue\_at\_X[t]] + [TGT\_RR\_at\_X[t+1] - (Trend\_RR\_at\_X[t] + Integral\_Delta\_at\_X[t] + Derivative\_Delta\_at\_X[t])]\}$$

where (a) GainRRate uses gain matrix 604 to convert a raw score to a review rate, (b) GainRScore uses gain matrix 604 to convert a review rate to a raw score, and TGT_RR_at_X[t+1] is a target goal established by supervisory control logic 606.

Figure 13:
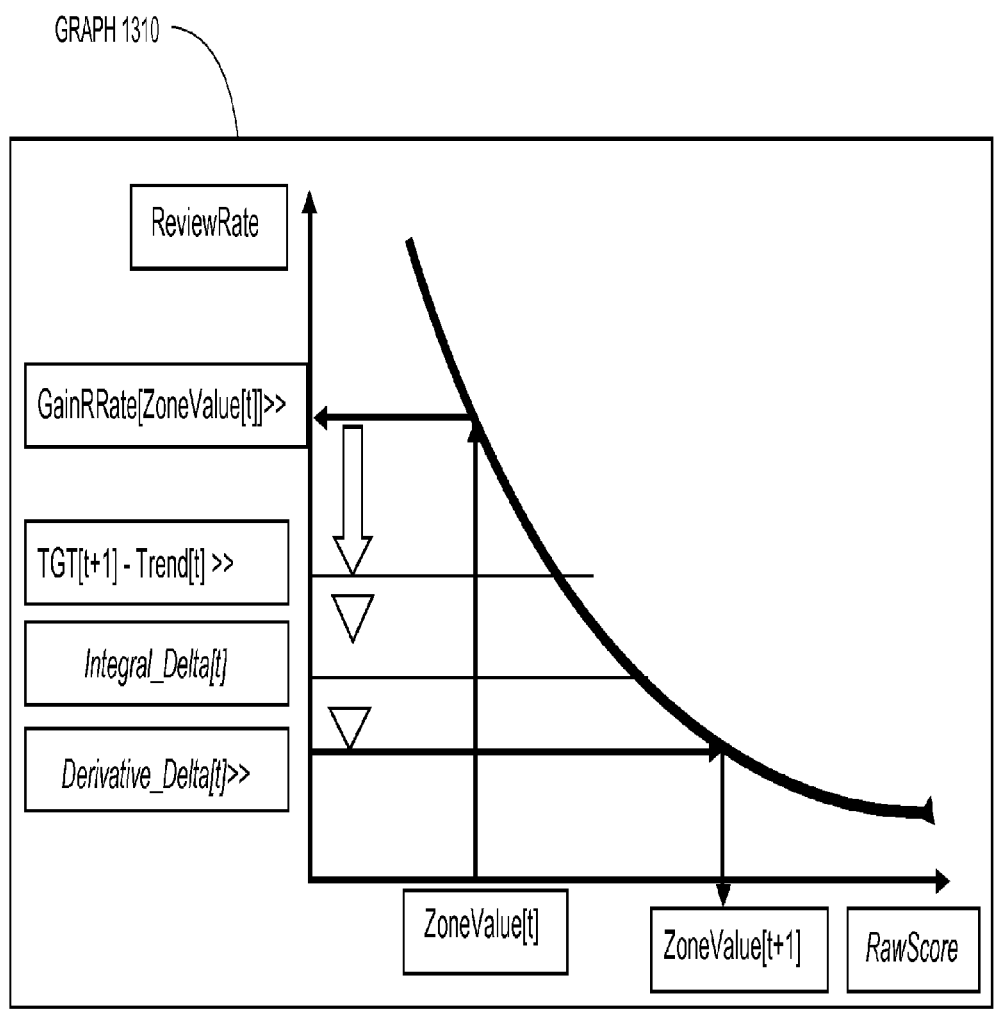
FIG. 13 illustrates how a new inflection point value is determined.

FIG. 13 includes a graph 1310 that depicts how a new inflection point value is determined. Each of the inputs in the above formulas is represented in graph 1310. In the depicted example, it is assumed that (1) TGT_RR_at_X[t+1]<Trend_RR_at_X[t]; (2) Integral_Delta_at_X[t]>0.0; and (3) Derivative_Delta_at_X[t}>0.0. In some real-word situations, TGT_RR_at_X[t+1] may be >=Trend_RR_at_X[t] and either one or both of Integral_Delta_at_X[t] and Derivative_Delta_at_X[t] may be negative.

The above formula may be used to calculate a new inflection point value for each of the four inflection points. It is possible to calculate new inflection point values for less than the 4 inflection points. The number of newly calculated inflection point values may be dictated by the specification or supervisory control. The new inflection point values may be used to modify the inflection point function. The frequency with which inflection point function may be modified may vary widely, such as daily, weekly, or monthly.

One benefit of an embodiment is that the inflection point values signals are automatically or dynamically adjusted. Another benefit of an embodiment is that the inflection point values are adjusted while maintaining the stability and smoothness of the review rate score curve.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
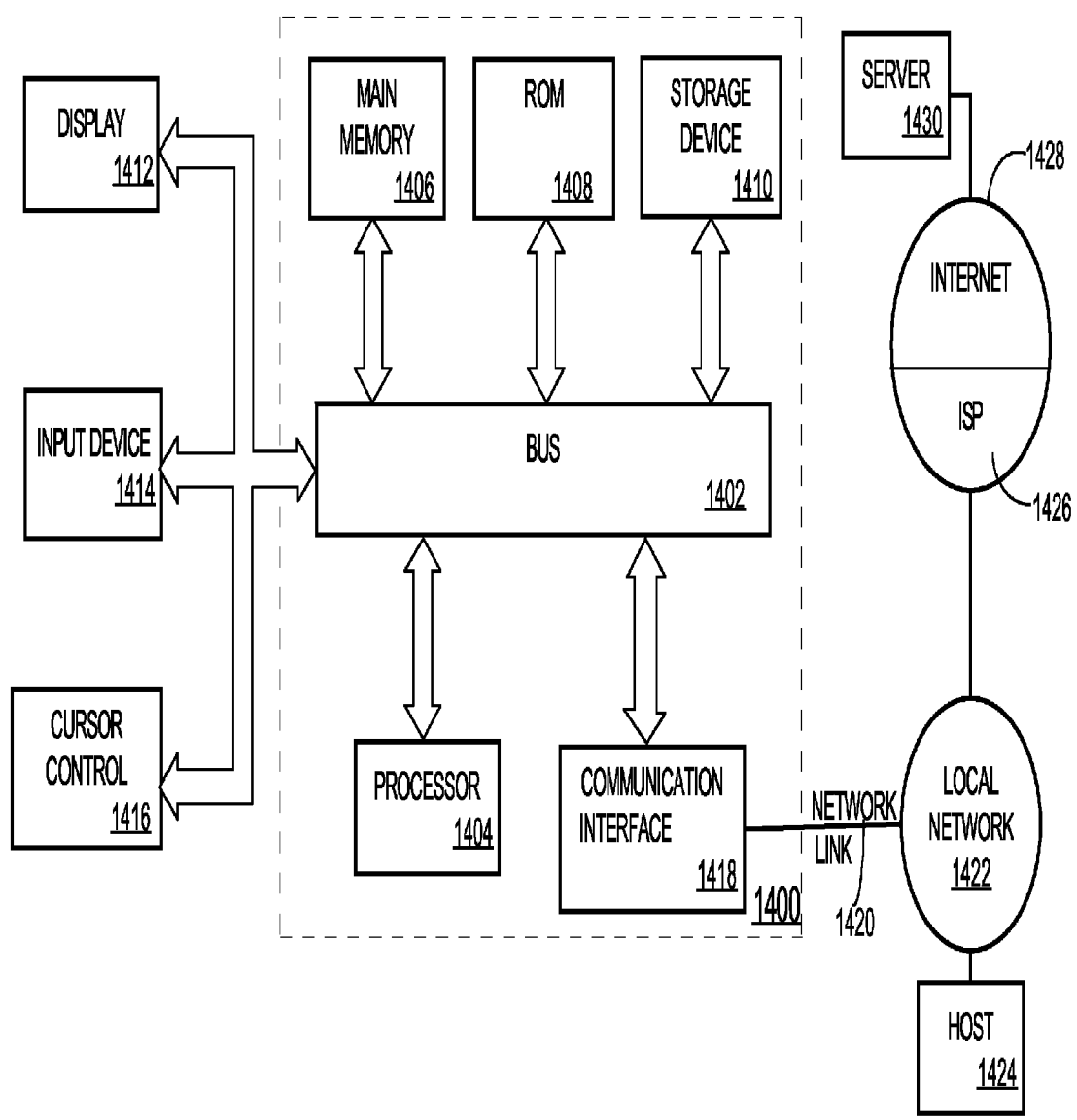
FIG. 14 illustrates a computer system upon which an embodiment may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP)

1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX A

Three piecewise curves (curves V, U, and W) are used to define an inflection point function. The three curves are joined at inflection points as illustrated in FIG. 2. A formula specification on these three curves is provided as follows:

Curve V Covers Zone III and Zone IV $$Score = SpanV * \left[1.0 - e^{-\left[\frac{RawScore - Z3}{DampV}\right]}\right] + R3,$$

where
DampV=[Z4−Z3]/Log [1.0−(R4−R3)/SpanV],
SpanV=99−R3, and
Center Point (Z3, R3) and Upper Point(Z4, R4) are inflection points as depicted in FIG. 2.

Log is a natural logarithm function. DampV is calculated based on the Z3 and Z4 inflection points. DampV is used to control the rate of rise and decay of Curve V.

Curve U Covers Zone II $$Score = SpanU * \left[e^{-\left[\frac{RawScore - Z3}{DampU}\right]} - 1.0\right] + R3,$$

where
DampU=[Z2−Z3]/Log [1.0+(R2−R3)/SpanU],
SpanU=SpanFactor*(R3−R2), where SpanFactor must be great than 1.0, and
Lower Point (Z2, R2) and Center Point(Z3, R3) are inflection points as depicted in FIG. 2.

Curve W Covers Zone I $$Score = SpanW * \left[1.0 - e^{-\left[\frac{RawScore - Z1}{DampW}\right]}\right] + R1,$$

where
DampW=[Z2−Z1]/Log [1.0−(R2−R1)/SpanW],
SpanW=SpanFactor*(R2−R1), and
Zero Point (Z1, R1) and Lower Point (Z2, R2) are inflection points as depicted in FIG. 2.

APPENDIX B

Gain Matrix Transformation Function

With a given set of inflection points ZeroPt(Zone, 10*Range), LowerPt(Zone, 10*Range), CenterPt(Zone, 10*Range) and UpperPt(Zone, 10*Range), a GainMatrix transformation function is specified as follows:

cts_1000_risky_rank =

{IntegerRound(Z + PivotCenter_K); If ScoreOut_Flag= 0
{
{999; if ScoreOut_Flag= 1*

Where,

Z =

{[1.0 − EXP[(CtsRawScore_Min − cts_raw_score)/DampW]] * SpanW −
{PivotCenter_K,
{if CtsRawScore_Min ≤ cts_raw_score ≤ LowerPtZone
{[EXP[(cts_raw_score − PivotCenter_H)/DampU] − 1.0] * SpanU,
{if LowerPtZone < cts_raw_score ≤ PivotCenter_H
{[1.0 − EXP[(PivotCenter_H − cts_raw_score)/DampV]] * SpanV,
{if PivotCenter_H< cts_raw_score

*If a factor code from a set of particular factor codes was generated (e.g., by the risk estimation engine in FIG. 4) as a result of a certain transaction, then ScoreOut_Flag=1.

Configuration and Parameters are specified below
RiskRankScale_Max=999.0; /*Static Constant to yield 1000 scale*/
CtsRawScore_Min=600.0; /*Minimal raw_cts_score from Recent Sampling of Transactions*/
CurvatureW_Factor=15.87; /*Lower Portion of the Curve*/
CurvatureU_Factor=3.35; /*Middle Portion of the Curve*//
These two curvature factors are used to shape the curvature for the low and middle portion of the RRSC, respectively.
For the upper portion of the curve, the curvature factor tends to be 1.0.
PivotCenter_H=CenterPtZone;
PivotCenter_K=CenterPtRange;
Inflection Center Point(PivotCenter_H, PivotCenter_K) acts as the pivot point.

This pivot point is used to change the curve of the S-shape hyperbolic tangent function from concave upward to concave downward for the middle and upper portions.

SpanW=CurvatureW_Factor*(LowerPtRange−ZeroPtRange);

SpanU=CurvatureU_Factor*(PivotCenter_K−LowerPtRange);

SpanV=RiskRankScale_Max−PivotCenter_K;

It may be important to have the span significantly larger than the vertical difference in between center point and passing through point for lower and middle portion of the curve as above.

Coefficients dampW, dampU and dampV are calculated automatically based on given inflection points. These "damp" coefficients are used to control the rate of rise or decay of the hyperbolic tangent function.

Coefficient dampW is applied to the lower section of the curve. Coefficient dampU is applied to the middle section of the curve. Coefficient dampV is applied to the upper section of the curve.

DampW=[CtsRawScore_Min−LowerPtZone]/LOG [1.0−(LowerPtRange−ZeroPtRange)/SpanW]

DampU=[LowerPtZone−PivotCenter_H]/LOG [1.0+(LowerPtRange−PivotCenter_K)/SpanU]

DampV=[PivotCenter_H−UpperPtZone]/LOG [1.0−(UpperPtRange−PivotCenter_K)/SpanV]

Generation of Gain Matrix

Based on a sampling of recent transactions and a set of inflection points, a gain matrix may be generated as follows.

Gain Matrix is a 1000×7 Matrix.

Instead of using row index, risky rank scale "k" is used and it ranges from 0, 1, 2, . . . , 999.

For each scale k=0, 1, 2, . . . 999, elements of the gain matrix are configured as below.

1000_Risky_Rank[k]=k, where k is the scale

From a modeling point of view, the higher the scale, the more risky the transaction.

Rank_Freq[k]=Sub total number of transactions of which its risky_rank scale=k.

Cts_Raw_Score Lower and Upper Bound[k]:

Lower Bound[k]=Minimal{cts_raw_score: where risky_rank_scale=k}

Upper Bound[k]=Maximal{cts_raw_scale: where risky_rank_scale=k}

Given cts_raw_score, the risky_rank_scale is calculated by the transform function specified above.

Accum_Freq[k]=Summation{Rank_Freq[i]: i=0, 1, 2, . . . k}

Freq_Remainder[k]=Total−Accum_Freq[k] where Total=total number of transactions from a given sampling of transactions.

Review_Rate[k]=Freq_Remainder/Total

What is claimed is:

1. A computer-implemented method for automatically adjusting a review rate score curve for detecting fraudulent transactions, the review rate score curve having a plurality of inflection points, the method comprises:

performing, by a computer system, for each of the inflection points:

receiving a time series representing a set of review rates at the inflection point over a predetermined duration;

generating a set of output data comprising a trend review rate output, an integral delta output, and an derivative delta output based at least on the time series for the inflection point; and generating an updated inflection point based at least on the set of output data; and generating an updated review rate score curve based at least on the updated inflection points.

2. The computer-implemented method of claim 1, further comprising:

receiving a raw score representing a fraud risk of an electronic commerce transaction; and generating a final score for the electronic commerce transaction indicating whether the electronic commerce transaction is to be accepted or rejected.

3. The computer-implemented method of claim 1, wherein generating the trend review rate output comprises applying a weighting function to the time series to give greater weight to recent review rates than to older review rates.

4. The computer-implemented method of claim 1, wherein generating the trend review rate output comprises applying a weighting function to the time series to eliminate high frequency variations of the review rates.

5. The computer-implemented method of claim 1, wherein the integral delta output is generated based on at least a scatter review rate function derived by subtracting the trend review rate output from the corresponding review rate in the time series.

6. The computer-implemented method of claim 5, wherein generating the integral delta output comprises applying a weighting function to the scatter review rate function to give greater weight to older review rates than to recent review rates.

7. The computer-implemented method of claim 5, wherein the derivative delta output is generated based at least on the scatter review rate function and on the integral delta output.

8. The computer-implemented method of claim 1, further comprising:

issuing an alarm if a review rate in the time series is outside a predetermined range.

9. The computer-implemented method of claim 1, further comprising:

adjusting a review rate in the time series downward if the review rate is above a first predetermined level; and adjusting the review rate in the time series upward if the review rate is below a second predetermined level.

10. A system comprising:

one or more processors; and one or more memories coupled to the one or more processors, the one or more memories storing machine executable code, which when executed by the one or more processors causes the one or more processors to perform a method comprising:

for each of a plurality of inflection points in a review rate score curve:

receiving a time series representing a set of review rates at the inflection point over a predetermined duration;

generating a set of output data comprising a trend review rate output, an integral delta output, and an derivative delta output based at least on the time series for the inflection point; and generating an updated inflection point based at least on the set of output data; and generating an updated review rate score curve based at least on the updated inflection points.

11. The system of claim 10, wherein the method further comprises:

receiving a raw score representing a fraud risk of an electronic commerce transaction; and generating a final score for the electronic commerce transaction indicating whether the electronic commerce transaction is to be accepted or rejected.

12. The system of claim 10, wherein generating the trend review rate output comprises applying a weighting function to the time series to assign greater weight to recent review rates than to older review rates.

13. The system of claim 10, wherein generating the trend review rate output comprises applying a weighting function to the time series to eliminate high frequency variations of the review rates.

14. The system of claim 10, wherein the integral delta output is generated based at least on a scatter review rate function derived by subtracting the trend review rate output from the corresponding review rate in the time series.

15. The system of claim 14, wherein generating the integral delta output comprises applying a weighting function to the scatter review rate function to give greater weight to older review rates than to recent review rates.

16. The system of claim 14, wherein the derivative delta output is generated based at least on the scatter review rate and the integral delta output.

17. The system of claim 10, wherein the method further comprises:
    issuing an alarm if a review rate in the time series is outside a predetermined range.

18. The system of claim 10, wherein the method further comprises:
    adjusting a first review rate in the time series downward if the first review rate is above a first predetermined level; and
    adjusting a second review rate in the time series upward if the second review rate is below a second predetermined level.

* * * * *